United States Patent [19]

Muszynski

[11] Patent Number: 5,790,528
[45] Date of Patent: Aug. 4, 1998

[54] SEMI-HARD HANDOFF IN A CELLULAR TELECOMMUNICATIONS SYSTEMS

[75] Inventor: Peter Muszynski, Helsinki, Finland

[73] Assignee: Nokia Telecommunications Oy, Espoo, Finland

[21] Appl. No.: 676,392

[22] PCT Filed: Jan. 27, 1994

[86] PCT No.: PCT/FI94/00038

§ 371 Date: Dec. 13, 1996

§ 102(e) Date: Dec. 13, 1996

[51] Int. Cl.$^6$ .................................................. H04Q 7/38
[52] U.S. Cl. ........................... 370/331; 455/442; 455/443
[58] Field of Search ........................... 370/328, 331–334; 455/436–444

[56] References Cited

U.S. PATENT DOCUMENTS

| 5,504,935 | 4/1996 | Vercauteren | 455/33.2 |
| 5,697,055 | 12/1997 | Gilhousen et al. | 455/33.2 |

FOREIGN PATENT DOCUMENTS

| 421 535 | 4/1991 | European Pat. Off. | |
| 577 960 | 1/1994 | European Pat. Off. | |
| 9508897A1 | 3/1995 | WIPO | H04Q 7/22 |
| 9508898A1 | 3/1995 | WIPO | H04Q 7/22 |
| 9520865A1 | 8/1995 | WIPO | H04Q 7/38 |

OTHER PUBLICATIONS

A. Salmasi et al., "On The System Design Aspects Of Code Division Multiple Access (CDMA) Applied To Digital Cellular And Personal Communications Networks," 41st IEEE Vehicular Technology Conference. Gateway to the Future Technology in Motion (Cat. No. 91C) Jul. 1991.

Primary Examiner—Melvin Marcelo
Attorney, Agent, or Firm—IP Group of Pillsbury Madison & Sutro LLP

[57] ABSTRACT

In a CDMA cellular telecommunications system, comprising mobile exchanges (MSC), base stations (BS) and mobile stations (MS), a new CDMA handoff procedure, a semi-hard handoff, is employed. Semi-hard handoff takes place within one and the same border base station (BS12), located in the boundary of two service areas (SA1, SA2) which are controlled by neighbouring mobile exchanges (MSC1, MSC2). This border base station is connected to and can be accessed from both of these neighbouring mobile exchanges. The inventive semi-hard handoff is a network based handoff of the communication control functions from the first to the second neighbouring mobile exchange without interrupting the active CDMA radio communications between the border base station (BS12) and the mobile station (MS).

6 Claims, 3 Drawing Sheets

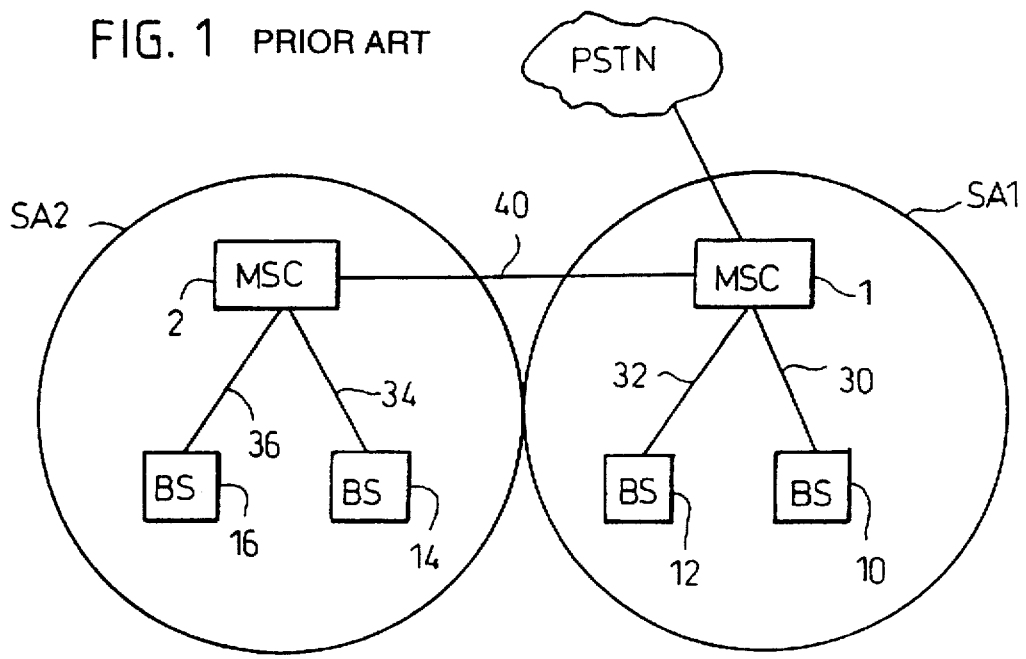
FIG. 1 PRIOR ART
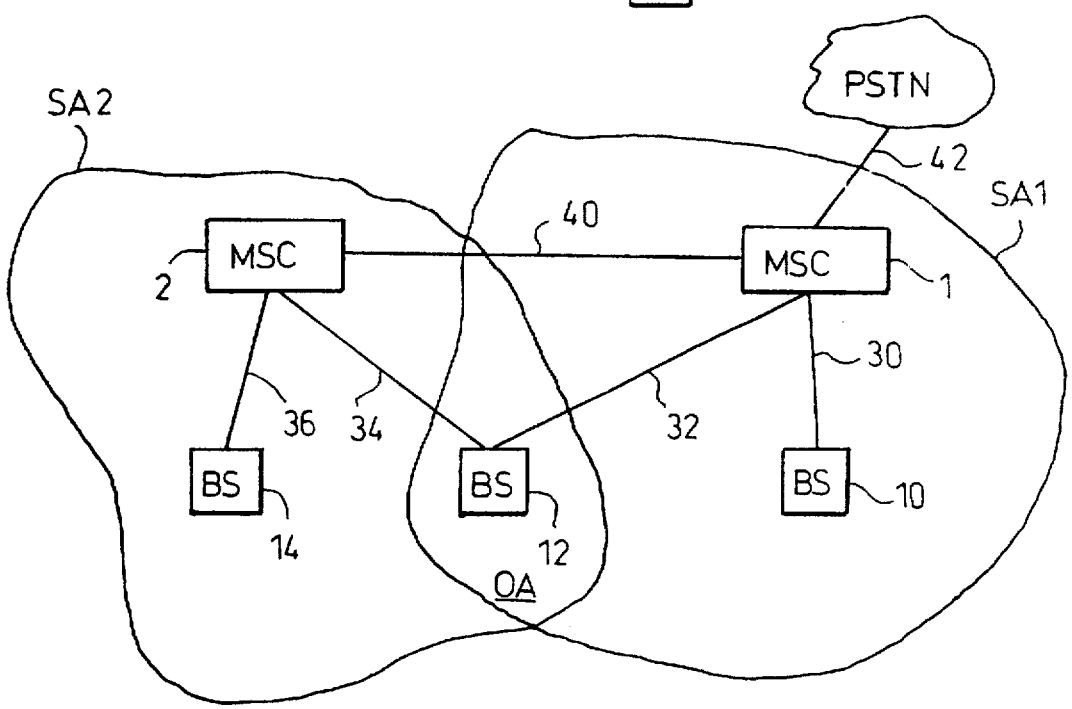
FIG. 2

SEMI-HARD HANDOFF IN A CELLULAR TELECOMMUNICATIONS SYSTEMS

FIELD OF THE INVENTION

The present invention relates to cellular telecommunications systems. More specifically, the present invention relates to a novel and improved system for handoff between a mobile station and base stations which are connected to different mobile switching centers within a cellular telecommunications system.

BACKGROUND OF THE INVENTION

The use of code division multiple access (CDMA) modulation is but one of several techniques enabling digital communications among a number of mobile users utilizing a common part of the radio spectrum, as is the case for cellular telecommunications systems. Other well-known radio access techniques are time division multiple access (TDMA) and frequency division access (FDMA). The concept of soft handoff to which the present invention is closely related, is indeed applicable to all three of the mentioned multiple access techniques and will result, if applied instead of the conventional hard handoff schemes, in increased system capacity and fewer dropped calls. However, soft handoff is mandatory for CDMA, as the use of conventional hard handoff would result in a very poor system performance. The background of the present invention will be presented for a CDMA cellular telecommunications system, however, it should be understood that the present invention is not limited to CDMA. An exemplary application of CDMA to cellular telecommunications systems has been substantially described in "On the System Design Aspects of Code Division Multiple Access (CDMA) Applied to Digital Cellular and Personal Communications Networks", Allen Salmasi and Klein S. Gilhousen, presented at the 41st IEEE Vehicular Technology Conference on May 19–22, 1991 in St. Louis, Mo.

In the above mentioned publication a direct-sequence CDMA (DS-CDMA, or shortly, CDMA in the following) technique is described in which a number of user mobile stations (MSs) communicate via CDMA radio spread spectrum signals with base stations (BSs, also referred to as cell sites) in the uplink (mobile station to base station) and downlink (base station to mobile station) direction. A typical network configuration of a prior art CDMA telecommunications system is shown in FIG. 1. The base stations BS 10, 12, 14 and 16 convert these CDMA radio signals originating from, respectively terminating at, the user's MS 20 into a form appropriate for use in conjunction with terrestrial telecommunications transmission equipment such as the commonly deployed Pulse Code Modulation (PCM) circuit facilities. The base stations further relay these user signals in the uplink and downlink direction to the mobile switching center 1 or 2 (MSC, also referred to as mobile exchange or mobile telephone switching office (MTSO)) for further processing.

The above mentioned user communication signals comprise digitized voice signals and control information (also referred to as signalling). The MSC performs multiplexing and conversion operations on the above mentioned tributaries and relays the voice signal to another user, e.g. within the Public Switched Telephone Network (PSTN). The MSC also interprets, reacts upon, and generates signalling information, thus controlling the overall communication link between the users. These communications link control functions comprise the management of general call related events such as call setup or tear down as well as CDMA radio link related events such as the deterioration of the CDMA radio link quality and subsequent handoff initiation.

If CDMA is deployed within the typical medium to large sized cells of land mobile telecommunications systems then the average time delay spread of the multipath radio propagation environment is usually larger than the chip duration of the DS-CDMA signal. This forces CDMA to operate in an asynchronous mode with the consequence that the orthogonality of the spread spectrum multiple access user signals cannot be achieved by means of orthogonal spreading codes alone. Therefore, the communications suffer from system self-induced interference not only among signals originating from different cells but in addition to that also considerably within a single cell (referred to as CDMA intra-cell interference). For such CDMA cellular systems it is therefore an important overall system design objective to minimize any excessive CDMA interference among the communicating users and complementary, to capture and utilize as much energy from a desired CDMA user signal as possible. This system design requirement, although a generic requirement applicable to any multiple access method within cellular telecommunications systems, is less stringent for FDMA and TDMA based systems in which intra-cell interference is avoided by the intrinsic properties of the respective multiple access method and inter-cell interference is limited by means of pre-planned cellular frequency re-use schemes. Thus, CDMA unlike FDMA or TDMA operates in a strictly interference limited manner.

Nevertheless, soft handoff will also improve the TDMA system capacity, however, the gain will be less than for a CDMA system. In the following, the invention is examplified for the case of a CDMA cellular telecommunications system.

Several methods implementing the above mentioned CDMA system design objective can be readily identified for the above referenced exemplary embodiment of a CDMA cellular telecommunications system. For example, the described closed loop MS transmit power control method has the objective to continuously equalize the received qualities of all uplink CDMA signals within a single BS against the background of rapidly changing radio propagation channels undergoing fast and slow fading processes. For this purpose, the BS measures periodically the received $E_b/N_o$ value, indicative of the signal quality, from each MS CDMA uplink communication and subsequently transmits an appropriate power control command on the downlink communication channel to the MS which in turn sets the CDMA transmitter power accordingly. Ideally, all MS CDMA uplink signals are received at the BS with the same quality and in addition to that, minimum strength necessary in order to maintain the communication link subject to a predetermined quality threshold.

Another embodiment of the previously mentioned system design objective is the method of mobile assisted soft handoff in conjunction with signal diversity combining during an active CDMA communication which will be summarized in the following and to which the present invention is closely related.

Mobile assisted soft handoff in conjunction with signal diversity combining comprises the method of relaying user communication signals on the transmission segment between MS and MSC concurrently via a first and a second BS in the uplink and downlink direction and performing signal diversity reception at the MS and MSC in order to enhance the user signal quality. This method is invoked by the MSC when a MS communicating initially with a single first BS has moved into the overlapping coverage areas of this first BS and a second BS and has reported the availability of a sufficiently strong signal from this second BS to the MSC. At no time instant during soft handoff in conjunction with signal diversity combining does the MS interrupt its communications with the MSC. The MSC typically deploys post-detection/decoding, selective combining of the digitally encoded speech frames.

In order to enable the reporting assistance of the MS during soft handoff initiation all BSs may transmit a CDMA downlink reference signal, referred to as pilot signal. MSs when roaming throughout the service area of the CDMA cellular telecommunications system periodically demodulate the pilot signals of the various neighboring BSs during an ongoing communication with a first BS and derive a corresponding pilot signal quality indication. Again, the measured pilot $E_b/N_o$ may be used as a signal strength/quality indication. This indication determines a ranked list of candidate BSs for handoff and is transmitted in form of signalling information to the MSC. It should be understood that also the first BS may perform continuously CDMA uplink signal quality measurements and based upon these observations may give a soft handoff request indication to the MSC.

Usually, soft handoff in conjunction with signal diversity combining is initiated by the MSC if the MS reports that the pilot signal quality of a second BS in addition to that of the first BS is sufficiently good according to the predetermined thresholds made available to the MS and the MSC as well as the second BS can obtain the required resources for the soft handoff transition. Subsequently, the MS will be instructed by the MSC via the first BS by means of signalling to initiate a soft handoff and to commence signal diversity combining on the downlink.

Moreover, the MSC initiates the additional relay of user signals via the second BS and commences diversity combining of the user signal in the uplink direction. Both participating BSs invoke autonomously the previously mentioned closed loop power control method. The MS sets its CDMA transmit power to the minimum of the two commanded power levels in order to reduce excessive CDMA interference with the other communication links.

Finally, when the MS is firmly established within the area of the second BS and the pilot signal received from the first BS has weakened sufficiently according to the predetermined thresholds made available to the MS it will report this condition to the MSC which in turn decides to terminate the soft handoff with signal diversity combining and will use subsequently only the second BS for maintaining the CDMA communications.

This process of soft handoff with signal diversity combining may be repeated as the MS moves within the service area of the CDMA cellular telecommunications system and as the measured CDMA signal quality indications suggest.

Some of the contemporary TDMA based cellular telecommunications systems also utilize the assistance of the MS in form of corresponding MS downlink signal quality measurements as trigger for requesting a handoff from a first BS to a second BS, much in the same way as summarized above. However, these systems usually use a scheme referred to as hard handoff in which the MS in response to instructions from the MSC disrupts the communication with the first BS, tunes into the indicated TDMA radio channel of the second BS, and then resumes the uplink and downlink communications. At no time instant does the MS communicate with more than one BS simultaneously and hence, no corresponding signal diversity combining takes place in the MS nor in the MSC as is the case for the soft handoff method described above. This conventional hard handoff scheme is applicable to CDMA in a similar manner as well, but should be avoided whenever possible, for reasons of CDMA system capacity as explained in the following.

Within the context of soft and hard handoff the previously mentioned predetermined thresholds used in conjunction with the MS downlink signal quality measurements for the determination of handoff candidate BSs are also referred to as handoff margins. The use of these handoff margins in conjunction with time averaging processes is necessary in order to avoid frequent handoffs (also referred to as handoff Ping-Pong effect) when the MS moves within the usually fuzzy border between the radio signal coverage areas of two neighboring BSs. Such frequent handdoffs would overload the processing capacity of the MSCs. For the purpose of controlling the CDMA soft handoff with signal diversity combining the handoff margin can be chosen as small as 1–3 dB in contrast to the conventional hard handoff case where usually 6–10 dB are required in order to avoid the deleterious handoff Ping-Pong effect.

Referring to the previously mentioned interference limited operation of CDMA, small handoff margins are indeed an essential requirement for an efficient operation of CDMA. The use of conventional CDMA hard handoff in conjunction with the necessary large hard handoff margins would substantially decrease the CDMA system capacity. In a CDMA cellular telecommunications system conventional hard handoff can be tolerated only in exceptional situations but not as a normal mode of system operation. The inventive semi-hard handoff will mitigate these short comings of the conventional hard handoff scheme.

A problematic type of handoffs is an inter-exchange handoff, i.e a handoff between BSs connected to neighbouring MSCs. The situation will be described with reference to FIG. 1 for a prior art cellular system. MS 20 can make soft handoff either within soft handoff area SA1 of MSC 1 or within soft handoff area SA2 of MSC 2, but not when it is moving within the border of these areas. E.g. if MS 20 is within the coverage areas of BS 12, 14 no soft handoff can take place. Assume that MS 20 is connected to BS 12 and moves towards BS 14, then a conventional CDMA hard inter-MSC handoff must be performed from BS 12 to BS 14 and MSC 1 to MSC 2 if MS 20 is to be handed off from soft handoff area SA1 to soft handoff area SA2 in prior art systems. This type of conventional hard handoff is unreliable and very detrimental for CDMA capacity because of the necessary hard handoff margins.

A DISCLOSURE OF THE INVENTION

Object of the invention is to avoid the detrimental effects (e.g. capacity reduction) of conventional CDMA inter-MSC hard handoffs.

One aspect of the invention is a cellular telecommunications system comprising a plurality of mobile stations, a first mobile exchange, a second mobile exchange, a plurality of base stations, a first group of said plurality of base stations being connected solely to said first mobile exchange, a second group of said plurality of base stations being connected solely to said second mobile exchange, and at least one of said plurality of base stations being a border base station connected to both said first mobile exchange and said second mobile exchange.

Another aspect of the invention is a semi-hard a handoff method for handing off communication control functions from said first mobile exchange to said second mobile exchange without disrupting radio communications of said MS and said at least one border base station.

According to the invention a new CDMA handoff procedure, referred below to as a semi-hard handoff, is employed. Semi-hard handoff takes place within one and the same base station (referred below to as a border base station), located in the boundary of two radio coverage areas which are controlled by different mobile exchanges (referred below to as neighbouring mobile exchanges). This border base station is connected to and can be accessed from both of these neighbouring mobile exchanges.

The inventive semi-hard handoff is a network based handoff of the communication control functions from the first to the second neighbouring mobile exchange without interrupting the active CDMA radio communications between the border base station and the mobile station. Semi-hard handoff requires switching means at the base station so as to be able to couple the user radio communications signals to any of the connected neighbouring mobile exchanges, as needed during semi-hard handoff execution.

By means of these multiple connections to the neighbouring mobile exchanges and the switching means of the border base station, an overlapping soft handoff service area between these neighbouring mobile exchanges is thus provided, this not being present in prior art cellular telecommunications systems. Semi-hard handoff thus takes place within this overlapping soft handoff service area (created by the border base station), thereby avoiding the undesirable conventional CDMA inter-exchange hard handoff.

BRIEF DESCRIPTION OF THE DRAWINGS

The features and advantages of the present invention will become more apparent from the detailed description set forth below when taken in conjunction with the drawings:

FIG. 1 is a schematic overview of a prior art CDMA cellular telecommunications system, FIG. 2 is a schematic overview of an exemplary CDMA cellular telecommunications system in accordance with the present invention;

DETAILED DESCRIPTION OF THE PREFERRED EMBODIMENTS

Figure 3:
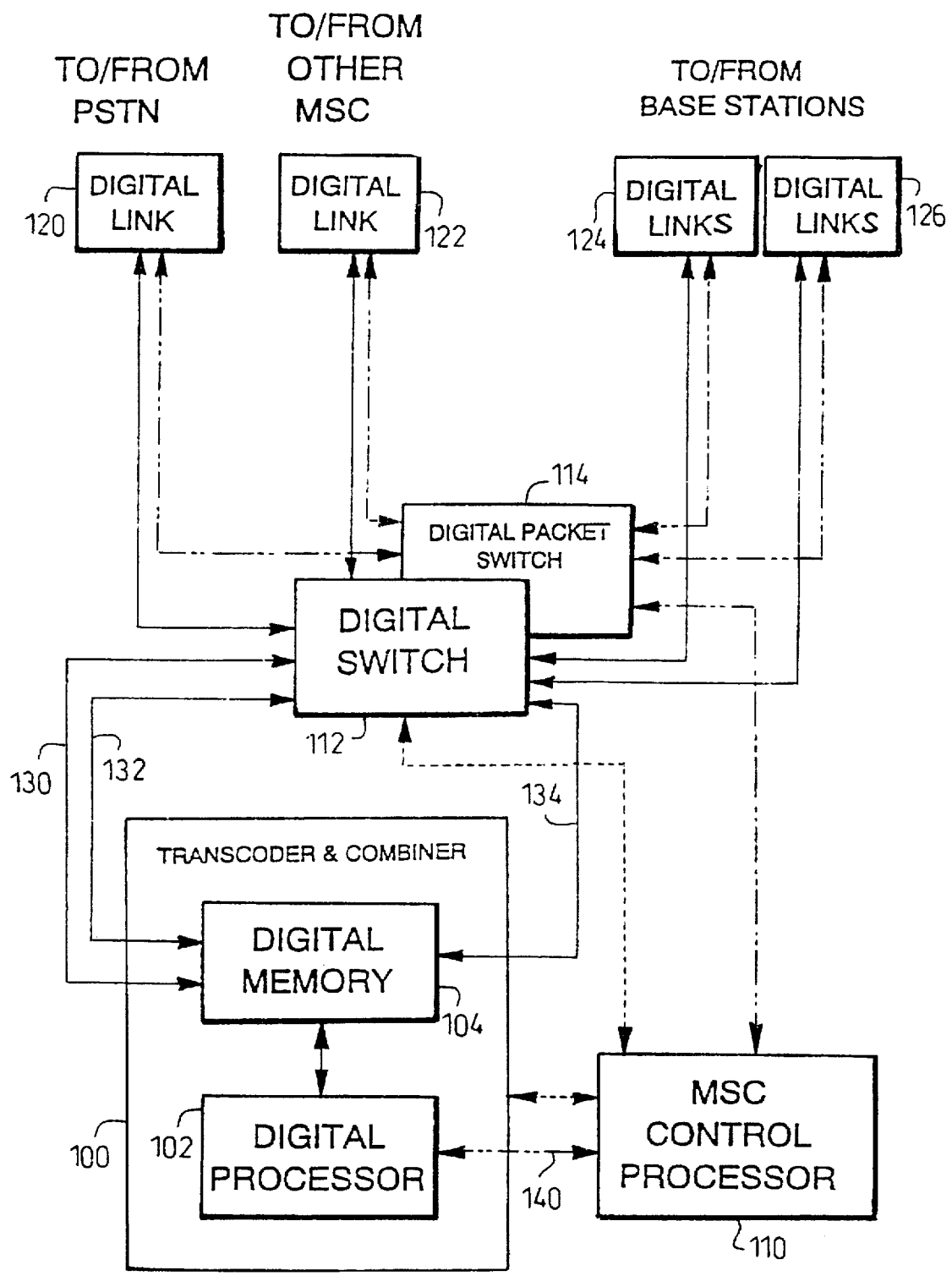
FIG. 3 is a block diagram showing a preferred embodiment of a mobile switching center for use within a CDMA cellular telecommunications system.

FIG. 2 shows an exemplary embodiment of a CDMA cellular telecommunications system to which the present invention relates. The system illustrated in FIG. 2 improves the prior art CDMA soft handoff and macrodiversity signal combining techniques, as substantially described in "On the System Design Aspects of Code Division Multiple Access (CDMA) Applied to Digital Cellular and Personal Communications Networks", Allen Salmasi and Klein S. Gilhousen, presented at the 41st IEEE Vehicular Technology Conference on May 19–22, 1991 in St. Louis, Mo.

BS 12 is the border BS connected via links 32, 34 to the neighbouring MSCs 1,2. This double connection of BS 12 effectively enlarges the soft handoff areas SA1, respectively SA2, of MSC 1 and MSC 2, thereby creating an overlapping soft handoff area OA. There may be other BSs 10,14 which are not located in the coverage border area and hence need to be connected to a single MSC (MSC 1, respectively MSC 2) only. Semi-hard handoff takes place in the overlapping coverage area OA.

In the following, the use of semi-hard handoff together with the prior art soft handoff is described. It is assumed that MS 20 moves in the direction from soft handoff area SA1 to SA2 and thereby passes through the radio coverage areas of BSs 10, 12, 14 (in this order).

Assume that MS 20 is initially connected to BS 10 via MSC 1 with the other system user (assumed to be located within the PSTN). As MS 20 moves on, it will enter additionally the radio coverage area of the border BS 12. Now prior art soft handoff may be initiated, thanks to the connection 32 of BS 12 to MSC 1. MSC 1 serves as signal diversity combining point and continues to control the connection.

As MS 20 moves away from BS 10 and comes closer to BS 12, the prior art soft handoff may be terminated and MS 20 communicates with BS 12 (via MSC 1) only.

If the received pilot signal strengths of BS 10,12, 14 as repeatedly measured by MS 20 and reported back to MSC 1 in form of neighbour cell measurement reports, indicate that MS 20 is sufficiently well established within the cell covered by BS 12 and continues to move away from BS 10 towards BS 14, the inventive semi-hard handoff may be invoked by MSC 1. This procedure is as follows:

From the pilot signal quality measurement reports performed by MS 20, MSC 1 learns that MS 20 is firmly established within the coverage area of BS 12 and continues to move away from BS 10 towards BS 14. Moreover, from cellular network configuration data, MSC 1 learns that BS 12 is also accessable by MSC 2 (via link 34). Thus, a semi-hard handoff to MSC 2 may be decided by MSC 1 in accordance with predetermined threshold parameters. To this end, MSC 1 will reserve a circuit towards MSC 2 on the digital link 40. MSC 1 may already now establish a bridge connection in the downlink direction, connecting the leg 42 coming from the PSTN with the new circuit on link 40.

MSC 1 will request the semi-hard handoff towards MSC 2 by sending appropriate signalling information to MSC 2, indicating also the newly allocated circuit on the transmission link 40. MSC 2 in turn will allocate and activate the required resources needed to process and control the ongoing communications. These resources include, but are not limited to, facilities to perform the diversity combining of the uplink user information frames (for possible later soft handoff within SA2), voice transcoding equipment for voice communications, MS and BS signalling link terminations and appropriate control processes.

MSC 2 will allocate a circuit on digital link 34 towards BS 12 and will request the semi-hard handoff within BS 12 by sending appropriate signalling information to BS 12, indicating also the newly allocated circuit on the transmission link 34.

BS 12, by means of its switch 250 (see FIG. 4), couples the ongoing radio communication signals from and to MS 20 with this newly allocated circuit on link 34. Then BS 12 will acknowledge the successful completion of the transaction to MSC 2 by sending an appropriate signal back to MSC 2.

MSC 2 will acknowledge the successful completion for the semi-hard handoff to MSC 1 by sending an appropriate signal back to MSC 1.

The signalling link to and from MS 20 can be connected to the newly allocated control processes within MSC 2. At this point in time MSC 2 may send a signalling link reset indication to MS 20 to Layer 2 of the MS - MSC links in order to restore the consistency of the signalling connections. MS 20 will respond to this reset operation by initializing its signalling link context together with MSC 2. However, such a reset operation does not affect the physical radio link layer (Layer 1). As a consequence, the usual CDMA closed loop power control operation can be performed between MS 20 and the supporting BS 12 without any disruption by the semi-hard hand-off. Morover, the signalling related to the call processing (Layer 3) is not affected.

MSC 1 upon receipt of the acknowledgement of successful completion of the semi-hard handoff from MSC 2, will switch over the uplink direction from link 32 to the uplink direction of the new link 40 and connect the latter one with the circuit on link 42. Once this operation is completed, the bi-directional communications of user information of MS 20 with the PSTN is fully restored. MSC 1 will also free the resources related to this user communication, including, but not limited to, facilities to perform the diversity combining of the uplink user information frames, voice transcoding equipment for voice communications, MS and BS signalling link terminations and appropriate control processes. MSC 1 will also release the circuit towards BS 12 on digital link 32. MSC 1 is thus not involved any more in controlling the call. However, MSC 1 will still serve as switching point between digital links 40 and 42. This terminates the inventive semi-hard handoff procedure. As the result, radio link control functions have been handed off from MSC 1 to MSC 2, without interrupting the ongoing radio link between BS 12 and MS 20, in particular, the closed loop power control of MS 20. The prior art soft handoff operation (controlled by MSC 2) can now take place within soft handoff area SA2. E.g., if MS 20 moves further on towards BS 14, a soft handoff from BS to 14 may be initiated.

Thus, a conventional CDMA hard handoff from MSC 1 to MSC 2 has been avoided with a corresponding gain in system robustness and capacity.

FIG. 3 shows an exemplary embodiment of a MSC used in a CDMA cellular telecommunications system to which the present invention relates.

Digital links 120,122,124 and 126 connect the mobile exchange MSC with the Public Switched Telephone Network PSTN, other mobile exchanges MSCs and base stations BSs, respectively. These digital links carry the user information such as voice and, additionally, signalling information. The preferred embodiment of the present invention assumes that the signalling information is multiplexed together with the user information onto one and the same physical transmission facility. T1 transmission facilities together with Signalling System No 7 may serve as an exemplary embodiment of such a digital link arrangement.

The user information stream is switched among the mentioned entities by means of a digital switch 112. The corresponding signalling information is transmitted, received and relayed by a packet switch 114. Packet switch 114 is also connected to a MSC control processor 110 which acts as a signalling information source and sink, respectively. MSC control processor 110 interprets and reacts upon signalling messages addressed to it and may also solicit signalling messages to other entities, whenever appropriate. MSC control processor 110 also controls the connection arrangements within the digital switch 112 in accordance with the call status. Moreover, MSC control processor 110 allocates and releases transcoder & combiner equipment 100 during call setup and tear down from a corresponding resource pool (only one piece of this transcoder & combiner equipment 100 is shown in the figure).

Transcoder & combiner equipment 100 is needed in order to convert between the typically μ-law encoded voice as used in the PSTN and the low rate digital voice coding such as CELP used on the radio links. In addition to the transcoding function, transcoder & combiner equipment 100 also implements the signal diversity combing in the uplink direction and signal duplication in the downlink direction. Moreover, transcoder & combiner equipment 100 synchronizes during soft handoff with signal diversity combining the information flows to and from the participating BSs, transmitted on the digital links 124, 126 and switched through digital switch 112 via circuits 130, 132 with the information flow to and from the PSTN, switched through the digital link 120, digital switch 112 and circuit 134 (only 2-branch BS diversity is depicted in FIG. 2).

In the preferred embodiment of the present invention, the user communication signals, comprising digitized voice or data, multiplexed together with the signalling information related to this connection, are carried in a digital, framed format suitable for the terrestrial transmission links 124,126 between the BSs and the MSC. These frames are subsequently referred to as transcoder & combiner frames. In addition to this user information, transcoder & combiner frames may also contain information supplied by the BSs which is relevant to the signal quality as used for the signal diversity combining within the MSC in the uplink direction. Moreover, the transcoder & combiner frames may contain digital signals supplied by the BSs and the MSC which are relevant for synchronizing the simultaneous links 124,126 between BSs and the MSC during a soft handoff with signal diversity combining.

These transcoder & combiner frames arriving and leaving on the circuits 130,132,134 are buffered in the digital memory 104 for the uplink and downlink direction, respectively. Digital processor 102 reads and writes cyclically the transcoder & combiner frames from and to digital memory 104. In the uplink direction, a signal quality indication attached to the transcoder & combiner frames arriving from circuits 130,132 into the memory 104 is inspected and processor 102 performs the diversity selection based on these indications. In the downlink direction, voice samples arriving from circuit 134 into the memory 104 are transcoded and packed into transcoder & combiner frames by processor 102.

Transcoder & combiner equipment 100 by means of the digital processor 102 also extracts, respectively inserts, the user signalling information from, respectively into, the transcoder & combiner frames and offers, respectively receives, this signalling information to MSC control processor 110 via a circuit 140. By these means, MSC control processor 110 receives MS signalling information such as pilot signal quality measurement reports. Thus, MSC control processor 110 possesses the necessary information to initiate and terminate soft and semi-hard handoffs. Furthermore, by these means MSC control processor 110 can issue the appropriate handoff commands to the MS via circuits 140, 130, 132 and links 124, 126 as well as via the digital packet switch 114 and link 122 to other MSCs, should this be required.

Figure 4:
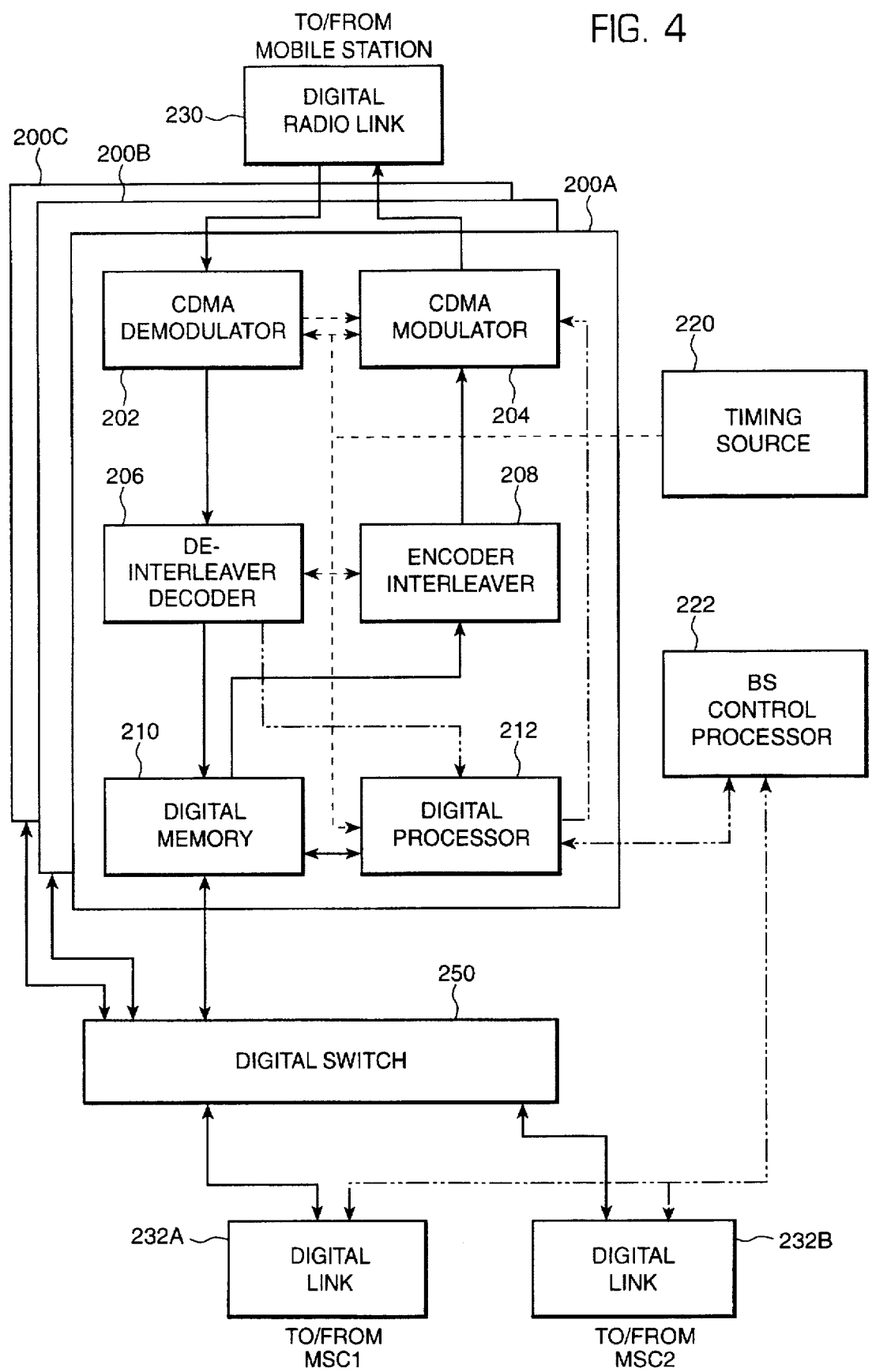
FIG. 4 is a block diagram showing a preferred embodiment of a base station for use within a CDMA cellular telecommunications system.

FIG. 4 shows an exemplary embodiment of a BS used in a CDMA cellular telecommunications system to which the present invention relates.

Block 200 shows the apparatus required to support a single CDMA communication within a BS, referred to as CDMA channel equipment. In FIG. 4, three similar channel units 200A, 200B and 200C are shown.

The base station according to the invention is connected to two mobile exchanges, e.g. MSC1 and MSC2, by means of digital links 232A and 232B, respectively. A digital switch 250 is provided between the channel units 200 and the digital links 232A and 232B for switching the user information stream from and to channel units 200A, 200B and 200C among the digital links 232A and 232B. The connections through the switch 250 may be dynamic connections which are circuit switched on demand, or the switch may be in a form of a fast packet switch. In the preferred embodiment of the invention the switch 250 is of a circuit switched on demand type. The base station configuration illustrated in FIG. 4 is suitable for base station 12 and 14 in FIG. 2. The base stations 10 and 14 may be of similar configuration except that only one MSC link is required and thereby the the digital switch 250 can be omitted.

In the uplink direction the CDMA user communication signals are received from the digital CDMA radio link 230, demodulated by the CDMA demodulator 202, deinterleaved and channel decoded by the de-interleaver & decoder 206, converted into transcoder & combiner frames and buffered for the terrestrial transmission within digital memory 210 and finally switched by digital switch 250 to selected one of the digital links 232A and 232B, and thereby transmitted towards MSC1 or MSC2.

In the downlink direction, the transcoder & combiner frames are received from MSC1 or MSC2 via digital link 232A or 232B, switched to the proper one of the channel units 200A, 200B and 200C by the digital switch 250, buffered and converted into a presentation appropriate for the BS within digital memory 210, channel encoded and interleaved by encoder & interleaver 208, CDMA modulated by the CDMA modulator 204 and finally transmitted on the digital radio link 230.

In the preferred embodiment of the present invention the BS possesses a network independent timing source 220 which provides a reference signal of high accuracy as required for efficient CDMA operation and utilized by the CDMA channel equipment 200. Such a timing source may be derived e.g. from the GPS satellite signal and can be provided globally to each BS thus enabling a network of mutually synchronized BSs.

The BS further comprises a BS control processor 222. The BS control processor 222 receives and transmits signalling information from and to digital links 232A and 232B connected to the MSC1 and MCS2, respectively. The BS control processor 222 performs the resource management of the BS, such as the allocation and releasing CDMA channel equipment for user connections (calls). The BS control processor 222 thus responds to CDMA channel assignment requests related to a call setup as well as to CDMA channel assignment requests related to soft and semi-hard handoff requests from the MSCs.

Digital processor 212 in conjunction with the buffer memory 210 performs the packing and unpacking of the BS internal representation of the CDMA user communications signal to and from transcoder & combiner frames in the uplink, respectively downlink direction. In the preferred embodiment of the present invention, the previously mentioned transcoder & combiner frames also contain information supplied by the de-interleaver & channel decoder 206 and provided to the digital processor 212 which is indicative of the signal quality of the CDMA radio frames as received from the uplink CDMA radio link 230 and which is used for the signal diversity combining within the MSC in the uplink direction.

As noted above, the present invention relates to an inter-exchange handoff referred to as semi-hard inter-MSC handoff. The MSCs involved with the handoff are assumed to be connected either permanently or temporarily via digital links for the transmission of user communication signals and inter-MSC handoff signalling information.

It should also be understood that the method of the present invention can be readily applied to a TDMA cellular telecommunications system. In a TDMA cellular telecommunications system, radio links would be embodied as TDMA radio links in which timeslots are used to provide communications channels to the systems users. During soft handoff with diversity combining, two (or more) timeslots could be used to provide the concurrent radio channels used by the MS and BSs involved in the handoff. All the other mentioned characteristics of the present invention remain the same for TDMA cellular telecommunications system.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

I claim:

1. A cellular telecommunications system comprising a plurality of mobile stations (MS20), a first mobile exchange (MSC1), a second mobile exchange (MSC2), a plurality of base stations, a first group (BS10) of said plurality of base stations being connected solely to said first mobile exchange (MSC1), a second group (BS14) of said plurality of base stations being connected solely to said second mobile exchange (MSC2), and at least one of said plurality of base stations being a border base station (BS12) connected to both said first mobile exchange and said second mobile exchange, means at said first mobile exchange for requesting a semi-hard handoff from said second mobile exchange, means at said second mobile exchange for allocating control and diversity combining resources required by said second mobile exchange for processing and controlling user communications, means at said at least one border base station for switching over user communications signals from said first mobile exchange towards said second mobile exchange, means at said second mobile exchange for taking control of user communications by means of said allocated resources, means at said second mobile exchange for informing an associated one of said plurality of mobile stations about the semi-hard handoff, means at said second mobile exchange for acknowledging the successful completion of the semi-hard handoff to said first mobile exchange, means at said first mobile exchange for releasing resources involved with user communications.

2. System according to claim 1, wherein the system is a CDMA system.

3. System according to claim 1, wherein the system is a TDMA system.

4. In a cellular telecommunications system comprising a plurality of mobile stations, a first mobile exchange, a second mobile exchange, a plurality of base stations, a first group of said plurality of base stations being connected solely to said first mobile exchange, a second group of said plurality of base stations being connected solely to said second mobile exchange, and at least one of said plurality of base stations being a border base station connected to both said first mobile exchange and said second mobile exchange, the method of semi-hard handoff for handing off the control and signal diversity combining functions involved with ongoing user communications from said first mobile exchange to said second mobile exchange without disrupting the radio communications between an associated one of said plurality of mobile stations and said at least one border base station, the semi-hard handoff comprising the steps of requesting a semi-hard handoff from said second mobile exchange by said first mobile exchange, allocating control and diversity combining resources required by said second mobile exchange for processing and controlling said ongoing user communications, switching over said ongoing user communications signals from said first mobile exchange towards said second mobile exchange at said at least one border base station, taking control of said ongoing user communications by said second mobile exchange by means of said allocated resources, informing said associated one of said plurality of mobile stations about the semi-hard handoff, acknowledging the successful completion of semi-hard handoff to said first mobile exchange, releasing resources involved with said ongoing user communications at said first mobile exchange.

5. Method according to claim 4, wherein the semi-hard handoff is utilized in a CDMA system.

6. Method according to claim 4, wherein the semi-hard handoff is utilized in a TDMA system.

* * * * *